United States Patent [19]

McMaster

[11] 4,222,763
[45] Sep. 16, 1980

[54] GAS JET PUMP, AND APPARATUS USING SAME

[76] Inventor: Harold A. McMaster, 420 Water St., Woodville, Ohio 43469

[21] Appl. No.: 968,232

[22] Filed: Dec. 11, 1978

[51] Int. Cl.² .......................... C03B 23/02; F04F 5/22
[52] U.S. Cl. ...................................... 65/287; 65/349; 417/171; 417/179
[58] Field of Search .............. 65/25 A, 111, 114, 117, 65/119, 287, 348, 349, 350, 351; 417/171, 179

[56] References Cited

U.S. PATENT DOCUMENTS

| | | | |
|---|---|---|---|
| 284,962 | 9/1883 | Huston | 417/197 |
| 334,597 | 1/1886 | Marsh | 417/170 |
| 1,039,958 | 10/1912 | Kimball | 417/108 |
| 1,314,539 | 9/1919 | Rusi | 417/108 |
| 3,047,208 | 7/1962 | Coanda | 230/95 |
| 3,173,273 | 3/1965 | Fulton | 62/5 |
| 3,208,229 | 9/1965 | Fulton | 62/5 |
| 3,213,807 | 10/1965 | Ramsden et al. | 103/262 |
| 3,340,819 | 9/1967 | Allen | 103/262 |
| 3,448,691 | 6/1969 | Frazier | 103/271 |
| 3,654,768 | 4/1972 | Inglis et al. | 62/5 |
| 3,672,790 | 6/1972 | White et al. | 417/108 |
| 3,857,651 | 12/1974 | Bruno | 417/171 |
| 4,028,009 | 6/1977 | Gudzenko et al. | 417/171 X |
| 4,046,492 | 9/1977 | Inglis | 417/197 |
| 4,059,427 | 11/1977 | Starr et al. | 65/114 X |
| 4,101,246 | 7/1978 | Erickson | 417/171 X |

Primary Examiner—Arthur D. Kellogg
Attorney, Agent, or Firm—Reising, Ethington, Barnard

[57] ABSTRACT

A gas jet pump (10) for producing a secondary flow of gas from a primary flow. The jet pump is disclosed as a tubular body (28) having a flow passage into which the primary flow is introduced through a plurality of jet openings (36, 38, 40) in the tubular body. Each jet opening has axial and circumferential components and is tangent with the surface defining the flow passage so as to produce a vortical flow in an axial direction within the body upon introduction of high pressure gas through the openings. The primary flow produces an amplified secondary flow through the tubular body. An annular manifold (22, 24, 26) is mounted on the tubular body to selectively feed the primary flow to the jet openings. The gas jet pump has application in sheet glass treating apparatus (50, 110), and has particular utility in apparatus used to bend sheet glass. A method of manufacturing a gas jet pump is also disclosed.

16 Claims, 10 Drawing Figures

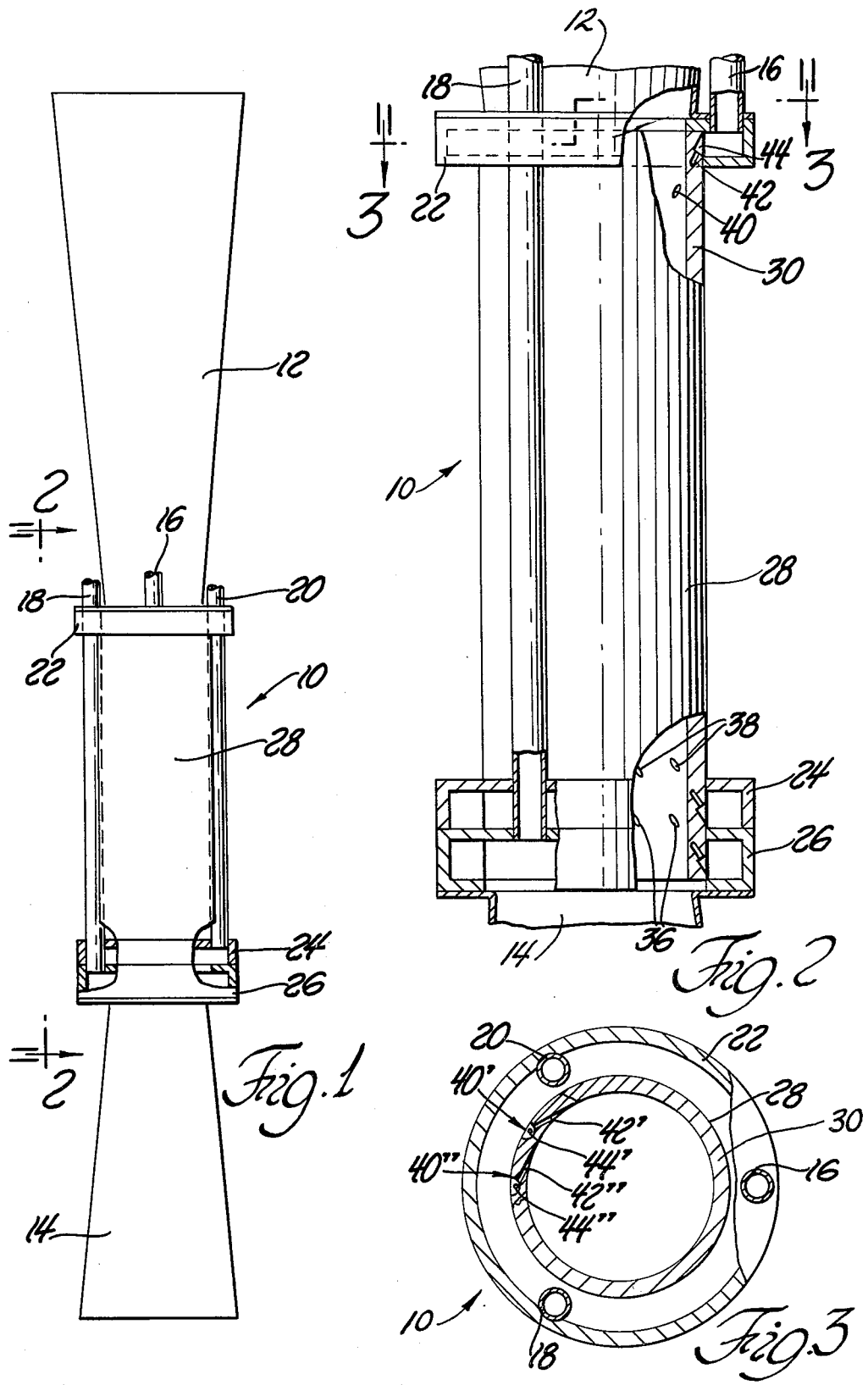

GAS JET PUMP, AND APPARATUS USING SAME

CROSS REFERENCE TO RELATED APPLICATIONS

This application is related to the application of Harold A McMaster et al, U.S. Ser. No. 968,231, which is a continuation-in-part of U.S. Ser. No. 872,202, filed Jan. 25, 1978 now abandoned; and to the application of Harold A. McMaster et al, U.S. Ser. No. 968,230, which is a continuation-in-part of U.S. Ser. No. 901,533, filed May 1, 1978 now abandoned, both applications being filed concurrently herewith and the entire disclosure of each being hereby incorporated by reference.

TECHNICAL FIELD

This invention relates to a gas jet pump for producing an amplified flow of secondary gas in response to a relatively smaller flow of primary gas from a source of pressurized gas. The jet pump has particular utility with sheet glass treating apparatus, especially where a sheet of softened glass is moved between positions along a direction transverse to the surface of the glass under the influence of positive or vacuum pressure.

BACKGROUND ART

A gas jet pump is used in applications where it is desired to develop a major flow of secondary gas from a relatively smaller flow of primary gas. In many practical industrial applications the gas is air, and the primary gas is referred to as a motive flow and the secondary gas is called a driven flow. Depending on relative flow quantities and pressures, a gas jet pump may be used for various purposes, including material handling, ventilation and the like.

One concern associated with the use of gas jet pumps is that the primary flow be continuous and not subject to interruption by the clogging of narrow throats or other restrictions in the path of the primary flow. Some forms of gas jet pumps utilize a thin film flow path which is subject to clogging by particulate material or other contaminants in their environment.

Moreover, it is a further concern that the secondary flow produced by the jet pumps be efficient in terms of air moved in the secondary flow by air consumed in the primary flow.

DISCLOSURE OF INVENTION

An object of the present invention is to provide a gas jet pump which will produce an efficient secondary flow from a relatively smaller primary flow in a manner which will make it suitable for use in various applications such as heated glass handling operations. A further objective is to provide a jet pump which has a primary flow path which is not subject to clogging as is a thin film flow path.

The present invention is incorporated by a gas jet pump which uses a distinctly configured primary flow path to admit pressurized gas. The admitted gas produces a secondary flow which is an amplification of the primary flow. The distinct configuration of the primary flow path produces a relatively efficient secondary flow and minimizes the likelihood of clogging and blockage of the primary flow.

In preferred form, the gas jet pump of the present invention comprises a tubular body whose central longitudinal opening provides a passage for the secondary flow. The primary flow is introduced through one or more jet openings formed in the wall of the tubular body. The jet openings through the wall are tangent to the inner surface of the wall and have axial and circumferential components with respect to the passage. The jet openings thus defined are formed in a group with the openings spaced circumferentially about the tubular body. In addition, more than one group may be used, where each group is spaced axially with respect to the other.

When pressurized gas is admitted through a jet opening it will enter the tubular body tangent to the inner wall thereof with a first circumferential flow component and with a second axial flow component parallel to the axis of the flow passage. The tangent relation of introduced gas minimizes impingement with the inner wall of the tubular member. The first circumferential flow component produces a vortex flow while the second axial flow component produces an efficient secondary flow through the central longitudinal flow passage of the tubular body.

A feature of the invention relates to the manner in which the jet openings are formed through the wall of the tubular body. More specifically, if a drilling operation is used to form a jet opening having the orientation described above, the drill will experience uneven loading effects once it broaches the inner wall of the tubular body. The uneven loading of the drill can cause it to deflect and break under an imbalance of lateral forces. A method has been devised to support the drill while boring out the jet openings. More specifically, the method calls for providing internal support by either means of a filler piece which has a shape complementary to the inner wall of the tubular body; or, alternatively, by drilling the primary flow path through either a solid cylindrical body or a tubular body with a substantially reduced central opening, and thereafter the machining out a central longitudinal opening in the cylindrical body or tubular body to the desired final diameter.

The gas jet pump of the present invention has particular utility for use with a glass treating apparatus and particularly where a heated sheet of glass is handled by the selective application of positive pressure and/or vacuum pressure to one or both of its surfaces. The positive pressure can be developed by directing the secondary flow toward a surface, and the vacuum pressure can be developed by drawing the secondary flow away from the surface.

This application of the gas jet pump has special merit where the glass treating apparatus is a glass bending station in which a softened sheet of glass is bent. The usual range of temperature in such a station is 1200°–1300° F. The gas jet pump can be located within the bending station and use the high temperature air in the station to produce the secondary flow, thus avoiding a large influx of cool external air. The relatively small primary flow can be heated prior to admission to the gas jet pump. This feature maintains temperature stability within the glass bending environment. It is preferred to the use of a blower apparatus and flow valve mechanism being placed within the bending station and the problems attending the operation of the blower motor and valve mechanism in such a high temperature environment.

Other advantages of the present invention will be readily appreciated as the same becomes better understood by reference to the following detailed description when considered in connection with the accompanying drawings.

BRIEF DESCRIPTION OF THE DRAWINGS

FIG. 1 is a front elevational view in partial section of a gas jet pump embodying the present invention;

FIG. 2 is an enlarged side elevational view in partial section of the gas jet pump taken along line 2—2 of FIG. 1;

FIG. 3 is a sectional view of the gas jet pump taken along line 3—3 of FIG. 2;

BEST MODE FOR CARRYING OUT THE INVENTION

Figure 4:
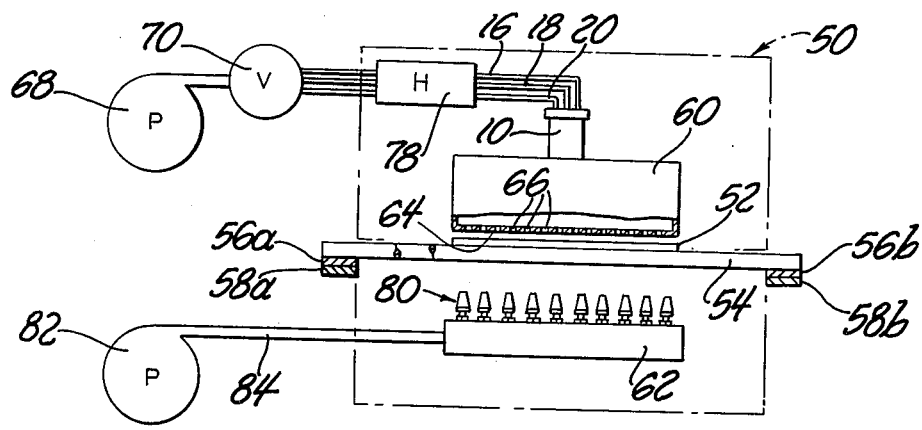
FIG. 4 is a schematic view of a glass treating station which shows the gas jet pump of FIG. 1 applied in use therein.

A gas jet pump embodying the present invention is generally indicated at 10 in FIG. 1. The gas jet pump 10 is shown connected between a pair of funnel-shaped conduits 12 and 14 which are used to facilitate flow through the pump.

The gas jet pump 10 comprises a tubular body 28 having a central opening defining a flow passage. A group of annular manifolds 22, 24 and 26 are mounted on the tubular body 28 proximate its opposed ends. In the present example, three manifolds are shown; one mounted proximate the upper end of the tubular body, and two mounted adjacent one another proximate the lower end. Each of the annular manifolds 22, 24 and 26 is isolated from one another and communicates with the tubular body 10 in a manner to be hereinafter described.

A supply line is in communication with each of the manifolds to supply it with gas from a high pressure source, typically air from a compressor. More specifically, as is best seen in FIGS. 1 and 2 collectively, a first supply line 16 supplies the manifold 22, a second supply line 18 supplies the manifold 26, and a third supply line 20 supplies the manifold 24.

With specific reference to FIG. 2, the tubular body 28 can be seen to have a wall 30 of a predetermined, uniform thickness. The annular manifolds 22, 24 and 26 are each communicated to the central opening of the tubular body 28 by respective sets of jet openings formed through the wall 30. In particular, the manifold 26 is communicated by the jet openings 36, the manifold 24 by the jet openings 38, and the manifold 22 by the jet opening 40. In preferred form, each set of the jet openings is distributed circumferentially about the inner surface of the wall 30 with equal axial position.

The configuration of each of the jet openings is shown by reference to both FIGS. 2 and 3.

As will be seen, each jet opening has an axial component and a circumferential component and is tangential to the inner surface of the wall 30 of the tubular body 28.

First considering FIG. 2, the jet opening 40, for example, is defined by a counterbored hole through the wall 30 of the tubular body 28. In particular, the axis of the hole is oriented at an acute angle with respect to the longitudinal axis of the tubular body 28. Prior to drilling a small diameter hole 42 through the full thickness of the wall 30, a large diameter counterbore is first made partly through the thickness of the wall 30. Such a counterbore lessens the thickness through which the smaller hole must be drilled.

The angle at which the counterbored hole is oriented will determine the axial direction of primary flow into the central opening of the tubular body 28, and, hence, the resultant direction of the secondary flow. In the embodiment of FIG. 2, the jet opening 40 will produce a downward secondary flow, while the jet openings 36 and 38 produce an upward secondary flow.

With specific reference to FIG. 3, a pair of jet openings 40' and 40'', which are members of the primed set of jet openings to which the previously described jet opening 40 belongs, are seen from a top view. The jet openings 40' and 40'' are each defined by a counterbored hole. The counterbored hole of jet opening 40' comprises a drilled hole 42' and a counterbore 44'. The counterbored hole defining the jet opening 40'' includes a drilled hole 42'' and a counterbore 44''.

Of specific interest is the orientation of each of the illustrated holes 42' and 42''. In each case, the inner end of the holes 42' and 42'' are tangential to the inner surface of the tubular body 28 at their respective points of juncture with the inner surface. This feature of each of the jet openings will cause each stream of relatively high velocity primary gas issuing from a jet opening to form an efficient vortex flow within the central opening of the tubular body 28. Each stream of gas issuing from the jet opening will therefore have an axial flow component, and a circumferential flow component. The axial primary flow component will induce a secondary axial flow through the central opening of the tubular body 28, and the circumferential primary flow component will induce a vortical secondary flow. The issuing jet streams of primary flow complement one another and promote efficiency in the inducement of secondary flow due to the tangent relation with the opening. More specifically, the primary gas jets will have both minimal impingement on the inner surface of the tubular body 28 and minimal interference with each other upon issuing into the central opening of the tubular body 28.

Figure 9:
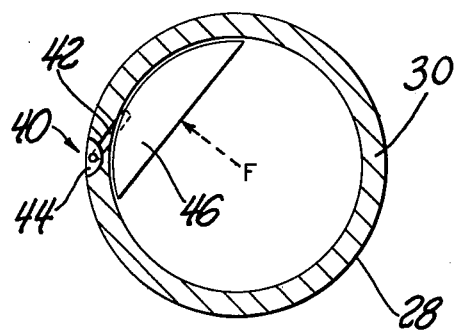
FIG. 9 is a schematic view of a gas jet pump of the present invention during manufacture showing one manner in which jet openings may be formed therein.
Figure 10:
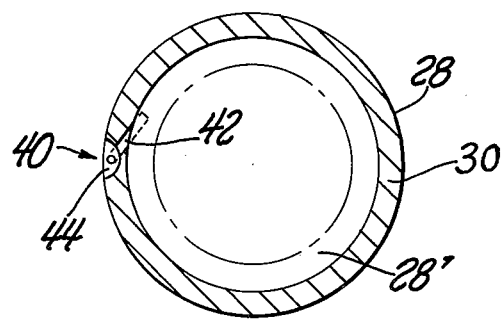
FIG. 10 is another view of a gas jet pump of the present invention during manufacture showing a second method for forming the jet openings therein.

FIGS. 9 and 10 illustrate preferred first and second methods for forming the jet openings in the tubular body 28.

With reference to FIG. 9, the first method calls for the use of a filler block 46 to support the drilling of the hole 42 of each jet opening 40. In drilling the hole 42, the drill bit will experience uneven side loading once it has broached the inner surface of the tubular body 28. To prevent deflection and breakage of the drill bit, the filler block 46 is supported against the inner surface by an applied force F. This will provide even loading on the drill bit at all times.

With reference to FIG. 10, the second method calls for the use of a piece of tubular stock having a wall thickness in excess of the finished wall thickness of the tubular body 28. The material indicated by the phantom line 28' is a somewhat exaggerated representation of this excess wall material. The excess material will supply even side loading to a drill bit while the hole 42 is being made. Thereafter, the excess material is machined away in a finishing operation to bring the wall thickness of the tubular body 28 to the desired size. The excess thickness of the wall may even be such that the stock material is a solid cylinder.

FIGS. 4, 5, 6 and 7 illustrate representative applications of the gas jet pump 10 previously described in connection with FIGS. 1, 2 and 3. These figures will next be described in order to show the adaptability of the gas jet pump to various practical applications.

FIG. 4 is a schematic view of a glass treating station indicated generally at 50. A sheet of glass 52 is conveyed within the station on a hearth formed of a plurality of elongated cylindrical rollers, as is represented by roller 54. The opposed ends of the rollers are supported on continuous drive loops 56a and b, and engagement of the roller ends with the drive loops will impart rotational motion to the roller 52, which, in turn, conveys the glass sheet 52 through the station. The continuous drive loops 56a and b are supported on a pair of respective tracks 58a and b.

The glass treating station 50 includes a lift holder 60 for lifting and holding glass from above, and a lower gas lifter 62 for supporting glass from below. The lift holder 60 operates by the selective application of positive pressure and vacuum pressure to the upper surface of the glass sheet 52. The gas lifter uses positive pressure to support the glass sheet. The upper lift holder 60 has a flat face 64 adjacent the glass sheet 52. The flat face 64 has formed in it a plurality of apertures 66 which permit positive and/or vacuum air pressure to be applied to the upper surface of the glass sheet 52.

A gas jet pump of the present invention, indicated generally at 10, is connected to the upper lift holder 60 and is used to supply positive pressure and/or vacuum pressure to the lift holder. The gas jet pump 10 is supplied with compressed air through a group of supply lines 16, 18 and 20 in the manner hereinbefore described. The compressed air is provided by a compressor or pump 68. The compressor 68 supplies valve means 70 which controls the selection of the supply lines 16, 18 and 20. A heat exchanger 78 is connected intermediate the valve means 70 and gas jet pump 10 to heat the compressed air prior to entry into the glass treating station 50 where temperatures are normally held at a range of 1200°–1300° F.

In the present case, the valve means 70 is used to select which of the lines 16, 18 and/or 20 will receive compressed air. With the gas jet pump 10 of FIG. 1, selection of supply lines 18 and 20 will produce an upward secondary flow through the jet gas pump 10 to create vacuum pressure on the upper surface of the glass sheet 52. In a typical operation, both of the supply lines 18 and 20 will be selected to raise the glass sheet 52, with only one supply thereafter required to maintain it in a raised position, as greater vacuum pressure is required to raise the glass than to sustain it in a raised position. Lift holder 60 is then moved upwardly by a suitable unshown actuator to allow a ring mold to be moved under it. Subsequently, by selection of the supply line 16, a downward secondary flow is produced by the gas jet pump 10 to create positive pressure of the upper surface of the glass sheet 52 in order to blow the glass downwardly onto the ring mold for bending under gravity.

The lower gas lifter 62 includes a plurality of a second type of gas jet pump 80. Compressed air is supplied by a compressor or pump 82 through a line 84 to the plurality of second type of gas jet pumps 80 to effect lifting of the glass sheet 52 by the application of positive pressure from below.

The second type of gas jet pump 80 does not form a part of the present invention, but is described presently in somewhat greater detail to explain its operation.

Figure 8:
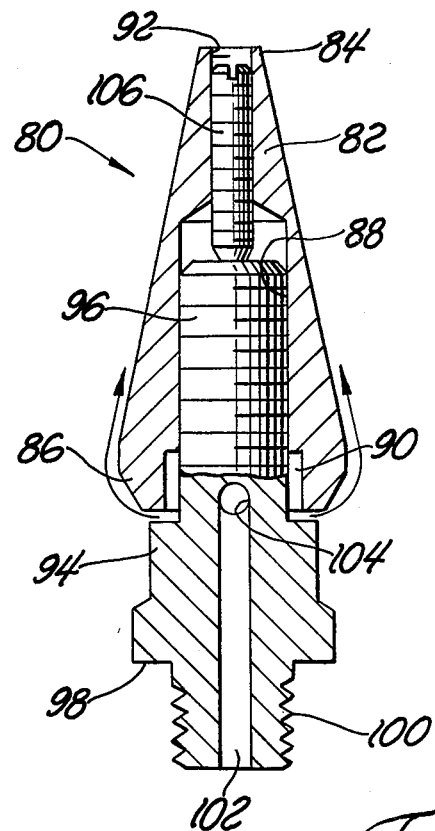
FIG. 8 is an elevational view in cross section of a separate form of gas jet pump used in the glass treating station of FIGS. 4 and 5.

With reference to FIG. 8, each of the plurality of gas jet pumps 80 includes a generally conical-shaped head section 82. The head section 82 has a truncated top 84 and an inwardly rounded lower shoulder 86. A first tapped bore 88 is formed from the bottom of the head section 82 along its longitudinal axis. A counterbore 90 is formed concentrially with the first tapped bore 88. A second tapped bore 92 is formed through the top of the head section 82 along its longitudinal axis in concentricity with the first tapped bore 88. A body section 94 includes an upper threaded stem 96 which is received in threaded engagement with the first tapped bore 88. The body section 94 has a lower shoulder 98 which steps down to a threaded male connector 100. A central axial bore 102 is formed through the body section 94 to the start of the threaded stem 96. The axial bore 102 is communicated to the annular volume defined by the counterbore 90 through a radial bore 104. A lockscrew 106 having a screwdriver slot or the like is in threaded engagement into the second threaded bore 92. The lockscrew 106 bears against the upper surface of the stem 96 to adjustably secure it against relative vertical movement. Adjustment of the spacing between shoulder 86 and body section 94 controls the extent of gas flow through the jet pump 80.

In the operation of the jet pump 80, when air or other gas from a high pressure source is admitted through the axial bore 102 it travels upwardly and out the radial bore 104 into the volume defined by the counterbore 90. The flow of compressed air then escapes from the jet pump 80 along the direction indicated by arrows. The outward flow entrains a secondary flow in a direction conforming to the surface of the conical head section 82.

Referring again to FIG. 4, by the proper application of positive pressure and vacuum pressure on the surfaces of the glass sheet 52 it can be moved vertically while in a softened state without deformation of the glass. The pressures applied to the upper surface of the glass sheet 52 are controlled by proper selection of the supply lines 16, 18 and 20 to the gas jet pump 10.

Figure 5:
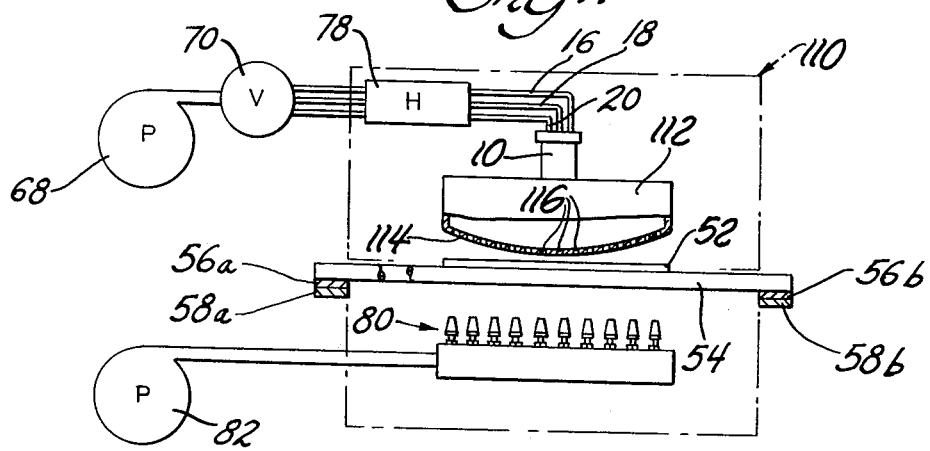
FIG. 5 is a schematic view of another, slightly varied glass treating station showing the gas jet pump of FIG. 1 applied in use therein.

FIG. 5 illustrates a second practical application of the gas jet pump 10 of the present invention in a related embodiment. More specifically, a glass treating station 110 is similar to the glass treating station 15 of FIG. 4, except for the fact that the lift holder 112 has a curved lower face 114. The curvature of the face 114 is convex with respect to the upper surface of the glass sheet 52. This feature is useful when the glass is being bent with deep bends.

A plurality of apertures 116 are formed in the curved lower face 114 to permit the application of positive pressure and/or vacuum pressure to the upper surface of the glass sheet 52. The pressures are developed by the secondary flows through the gas jet pump 10 connected to the lift holder 112. The sheet of glass is first lifted off the conveyor rollers 54 and the holder 112 is then moved upwardly by an unshown actuator so that a mold ring can be moved under the holder. The vacuum drawn by jet pump 10 at the holes of curved surface 114 and the upwardly directed gas from jet pumps 80 cooperate to prebend the glass. Termination of the gas flow from jet pumps 80 is then accompanied by positive pressure gas supplied by jet pump 10 to openings 116 so as to force the glass downwardly onto the mold ring for further bending.

In connection with the glass bending operations described above, reference should be made to the applications previously herein incorporated by reference.

Figure 6:
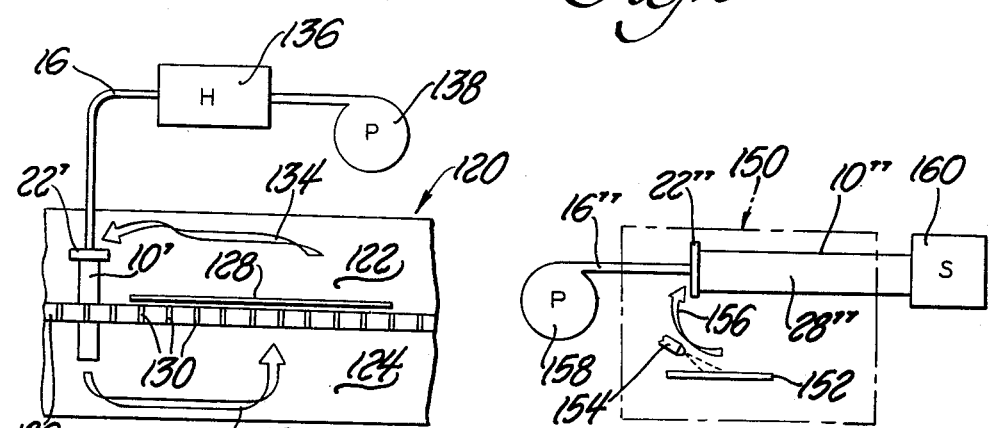
FIG. 6 is a schematic view of a gas hearth glass treating station showing the gas jet pump applied in use therein.

FIG. 6 illustrates another application of the gas jet pump of the present invention. More specifically, a glass processing station, indicated generally at 120, includes an upper plenum 122 and a lower plenum 124 divided by a gas hearth 126. The glass processing station 120 may, for example, be a heating chamber. The gas hearth 126 has an array of spaced apertures 130 formed therethrough to communicate the lower plenum 124 with the upper plenum 122.

A sheet of glass 128 which is undergoing processing and may be in a softened state, is supported above the gas hearth 126 by the effect of upward air flow from the lower plenum 124 through the apertures 130 into the upper plenum 122.

A gas jet pump 10' is connected between the upper plenum 122 and the lower plenum 124 to produce the air flow required to support the sheet of glass 128 above the gas hearth 126. The gas jet pump 10' receives heated, compressed air through a supply line 16' connected to its annular manifold 22'. The air is compressed by a compressor or pump 138 and heated by a heating unit 136 preparatory to being supplied to the gas jet pump 10'. The gas jet pump 10' will produce the secondary flow into the lower plenum 124 as indicated by the flow line 132. The flow will pass through the apertures 130 in the gas hearth 126 to provide support for the sheet of glass 128. The flow returns, as indicated by line 134, to re-entry of the secondary flow path through the gas jet pump 10'.

Figure 7:
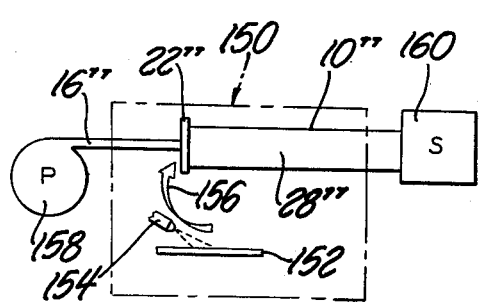
FIG. 7 is a schematic view of a materials processing station in which the gas jet pump is used for the removal of by-products of the materials processing.

FIG. 7 illustrates still another exemplary application of a gas jet pump of the present invention. More specifically, a material treating station is indicated generally at 150. A sheet of work material 152 undergoes treatment by a spray gun 154. It is assumed that the treatment process yields as a by-product one or more types of gaseous, particulate or similar form industrial waste.

In this application, a gas jet pump 10" embodying the present invention has one end of its tubular body 28" within the station 150, and another end extending outside the station. The annular manifold 22" receives compressed air from a compressor or pump 158 through a supply line 16". The gas jet pump 10" produces a secondary flow, as indicated by flow line 156, through the tubular body 28". The flow is discharged to a gas scrubber 160 for cleansing before discharge to the atmosphere. In this manner, the by-product of the materials treatment process is carried away for discharge through the gas jet pump 10".

The invention has been described in an illustrative manner, and it is to be understood that the terminology which has been used is intended to be in the nature of words of description rather than limitation.

Many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A gas jet pump for producing a secondary flow of gas from a primary flow of gas, the pump comprising:
   a passageway having a flow axis and an inner surface which extends along the flow axis with a cross section that has a smoothly curved shape and is concave with respect to the interior of the passage; and
   a plurality of jet openings formed in the surface for introducing the primary gas flow into the passage, each jet opening having axial and circumferential components and being substantially tangent to the inner surface of the passage such that the primary flow introduced thereinto flows vortically in an axial direction and moves a secondary flow of gas therewith through the passage.

2. A gas jet pump for producing a secondary flow of gas from a primary flow of gas, the pump comprising:
   a tubular body having a round inner surface defining a passage; and
   a plurality of jet openings formed in the tubular body for introducing the primary flow into the passage, each jet opening having axial and circumferential components and being substantially tangent to the inner surface of the tubular body such that the primary flow introduced thereinto flows vortically in an axial direction and moves a secondary flow of gas therewith through the passage.

3. The gas jet pump as defined in claim 2 wherein the jet openings are distributed circumferentially about the tubular body with equal axial position.

4. The gas jet pump as defined in claim 2 wherein the plurality of jet openings comprises first and second axially spaced sets of jet openings, the openings of each set being distributed circumferentially about the tubular body.

5. The gas jet pump as defined in claim 4 wherein the axial components of the jet openings of the first and second sets are oriented in the same axial direction.

6. The gas jet pump as defined in claim 4 wherein the axial components of the jet openings of the first and second sets are oriented in mutually opposite directions.

7. The gas jet pump as defined in claim 2 further comprising funnel-shaped members connected at each end of the tubular body for facilitating the flow through the tubular body.

8. The gas jet pump as defined in claim 2 wherein in each of the jet openings has a counterbored shape.

9. The gas jet pump as defined in claim 2 further including manifold means mounted on the tubular body in communication with the jet openings.

10. The gas jet pump as defined in claim 9 wherein the manifold means comprises an annular chamber mounted exteriorly on the tubular body in communication with a circumferentially spaced set of the jet openings so as to receive the primary flow of gas which is thereby fed to the passage.

11. A gas jet pump for producing a secondary flow of gas from a primary flow of gas, the pump comprising:
   a tubular body having a round inner surface defining a passage;
   a plurality of jet openings formed in the tubular body for introducing the primary flow into the passage, the jet openings being arranged in at least three axially spaced sets, the openings of each set being spaced circumferentially with respect to each other, each jet opening having axial and circumferential components and being substantially tangent to the inner surface of the tubular body, two of the sets of the jet openings being located adjacent each other proximate one end of the tubular body with the jet openings thereof oriented in the same axial direction, another set being located proximate the other end of the tubular body with the jet openings thereof oriented in the opposite axial direction as the jet openings of the first-mentioned two sets; and manifolds mounted on the tubular body for selectively feeding the primary flow of gas to the jet openings of each set such that the primary flow of gas fed therethrough flows vortically in an axial direction and moves a secondary flow of gas therewith through the passage.

12. Sheet glass treating apparatus including an enclosed chamber where the sheet glass is treated while isolated from the environment, the apparatus comprising:

a gas jet pump located within the chamber and including an elongated tubular body having a round inner surface defining a flow passage and including a plurality of jet openings formed in the tubular body extending to the inner surface thereof in a tangential relation therewith and having both axial and circumferential components with respect to the longitudinal axis of the tubular body; and a source of pressurized gas located externally of the enclosed chamber and being communicated with the jet openings of the tubular body such that gas from the source is introduced therethrough into the flow passage and flows vortically in an axial direction and moves a secondary flow of gas therewith through the flow passage.

13. Apparatus for use in bending heated sheet glass, the apparatus including a heating chamber, a horizontal conveyor for moving sheet glass through the heating chamber, a vacuum holder having a lower surface positioned above the conveyor and including spaced openings through the surface; a control system for the holder comprising:

a gas jet pump located within the chamber and including an elongated tubular body having a round inner surface defining a flow passage, the tubular body having a first end communicated with the openings in the surface of the holder and a second end that opens within the chamber, and a plurality of jet openings formed in the tubular body extending to the inner surface thereof in a tangential relation therewith and having both axial and circumferential components with respect to the longitudinal axis of the tubular body, the axial component of each jet opening being oriented toward the second end of the tubular body away from the first end thereof, and a source of pressurized gas located externally of the enclosed chamber and being communicated with the jet openings of the tubular body such that gas from the source is introduced thereinto through the jet openings and flows vortically in an axial direction to move a secondary flow of gas therewith through the flow passage so as to support the heated sheet of glass on the holder surface.

14. Apparatus for use in bending heated sheet glass, the apparatus including a heating chamber, a horizontal conveyor for moving sheet glass through the heating chamber, a vacuum holder having a lower surface positioned above the conveyor and including spaced openings through the surface; a control system for the holder comprising:

a gas jet pump located within the chamber and including an elongated tubular body having a round inner surface defining a flow passage, the tubular body having a first end communicating with the openings in the surface of the holder and a second end that opens within the chamber, and a plurality of jet openings formed in the tubular body in first and second axially spaced sets, each of the jet openings extending to the inner surface of the tubular body in a tangential relation therewith and having both axial and circumferential components with respect to the longitudinal axis of the tubular body, the axial component of each jet opening being oriented toward the second end of the tubular body away from the first end thereof;

a source of pressurized gas located externally of the enclosed chamber; and valve means, interconnected between the source of pressurized gas and the gas jet pump, for selective communication of pressurized gas to one or both of the sets of jet openings in the tubular body such that gas from the source is introduced into the tubular body through the selected jet openings and flows vortically in an axial direction to move a secondary flow of gas therethrough through the flow passage, thereby developing a vacuum pressure in the holder of a first magnitude if one set of jet openings is selected and of a second magnitude if both sets are selected.

15. Apparatus for use in bending heated sheet glass, the apparatus including a heating chamber, a horizontal conveyor for moving sheet glass through the heating chamber, a holder having a lower surface positioned above the conveyor and including spaced openings through the surface; a control system for the holder comprising:

a gas jet pump located within the chamber and including an elongated tubular body having a round inner surface defining a flow passage, the tubular body having a first end communicating with the openings in the surface of the holder and a second end that opens within the chamber, and a plurality of jet openings formed in the tubular body in first and second axially spaced sets, each of the jet openings extending to the inner surface of the tubular body in a tangential relation therewith and having both axial and circumferential components with respect to the longitudinal axis of the tubular body, the axial component of each jet opening of the first set being oriented toward the second end of the tubular body away from the first end thereof, and the axial component of each jet opening of the second set being oriented toward the first end away from the second end;

a source of pressurized gas located externally of the enclosed chamber; and valve means, interconnected between the source of pressurized gas and the gas jet pump, for selective communication of pressurized gas to one or the other of the sets of jet openings in the tubular body such that gas from the source is introduced into the tubular body through the selected set of jet openings and flows vortically in an axial direction to move a secondary flow of gas therewith through the flow passage, thereby developing a vacuum pressure in the holder when the first set of jet openings is selected, and developing a positive pressure in the holder when the second set of jet openings is selected.

16. Apparatus for use in bending heated sheet glass, the apparatus including a heating chamber, a horizontal conveyor for moving sheet glass through the heating chamber, a holder having a lower surface positioned above the conveyor and including spaced openings through the surface; a control system for the holder comprising:

- a gas jet pump located within the chamber and including an elongated tubular body having a round inner surface defining a flow passage, the tubular body having a first end communicating with the openings in the surface of the holder and a second end that opens within the chamber, and a plurality of jet openings formed in the tubular body in first and second axially spaced sets proximate the first end of the tubular body and in a third set proximate the second end, each of the jet openings extending to the inner surface of the tubular body in a tangential relation therewith and having both axial and circumferential components with respect to the longitudinal axis of the tubular body, the axial component of each jet opening of the first and second sets being oriented toward the second end of the tubular body away from the first end thereof, and the axial component of each jet opening of the third set being oriented toward the first end away from the second end;
- a source of pressurized gas located externally of the enclosed chamber; and
- valve means, interconnected between the source of pressurized gas and the gas jet pump, for selective communication of pressurized gas to the sets of jet openings in the tubular body such that gas from the source is introduced into the tubular body through the selected jet openings and flows vortically in an axial direction to move a secondary flow of gas therewith through the flow passage, thereby developing a vacuum pressure in the holder of a first magnitude if one of the first or second sets is selected, a vacuum pressure of a second magnitude if both the first and second sets are selected, or a positive pressure in the holder if the third set of jet openings is selected.

* * * * *

UNITED STATES PATENT AND TRADEMARK OFFICE
CERTIFICATE OF CORRECTION

PATENT NO. : 4,222,763
DATED : September 16, 1980
INVENTOR(S) : Harold A. McMaster It is certified that error appears in the above—identified patent and that said Letters Patent is hereby corrected as shown below:

Claim 1, Column 8, Line 9 (Claim 1, Page 15, Line 7), "passageway" should be --passage--.

Signed and Sealed this

Twelfth Day of May 1981

[SEAL]

Attest:

RENE D. TEGTMEYER

Attesting Officer     Acting Commissioner of Patents and Trademarks